S. F. DYKES.
SEED PLANTER.
APPLICATION FILED NOV. 6, 1908.
912,296.
Patented Feb. 16, 1909.
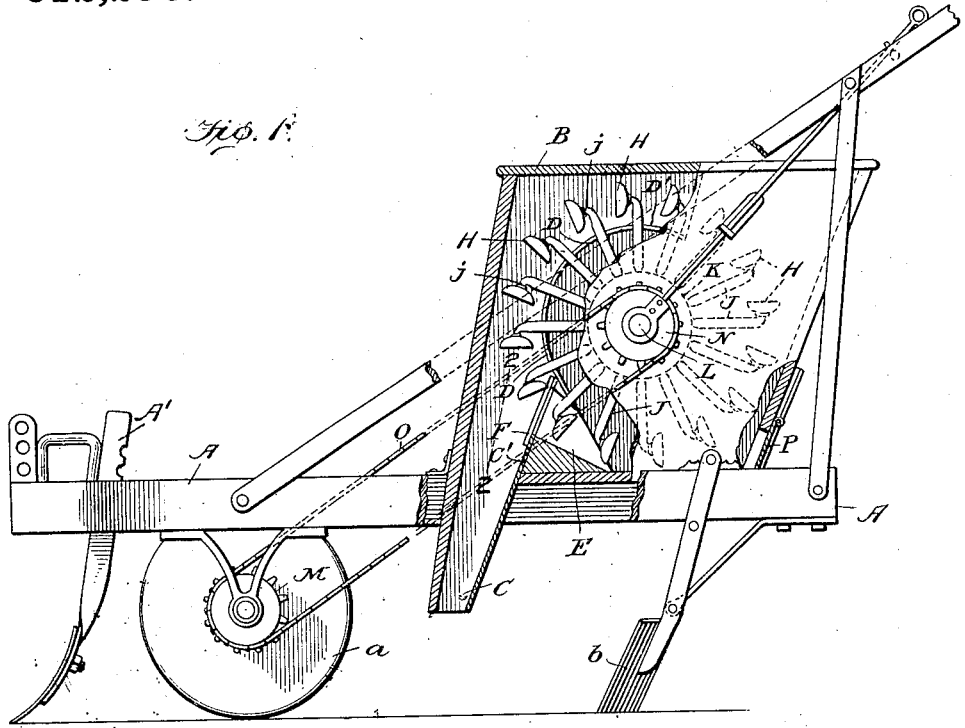
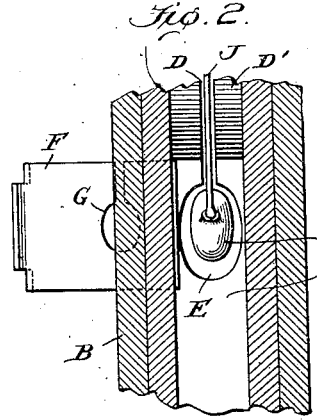
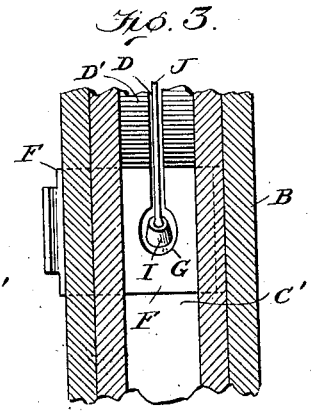
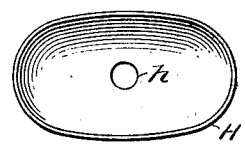
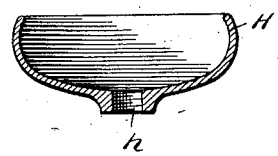
Witnesses
L. Bradford
Richard E. Babcock
Inventor
Sarah F. Dykes
by
W. H. Babcock
Attorney

UNITED STATES PATENT OFFICE.

SARAH FRANCES DYKES, OF HAWKINSVILLE, GEORGIA.

SEED-PLANTER.

No. 912,296.　　　　　Specification of Letters Patent.　　　　　Patented Feb. 16, 1909.

Application filed November 6, 1908. Serial No. 461,351.

*To all whom it may concern:*

Be it known that I, SARAH FRANCES DYKES, a citizen of the United States, residing at Hawkinsville, in the county of Pulaski and State of Georgia, have invented certain new and useful Improvements in Seed-Planters; and I do hereby declare the following to be a full, clear, and exact description of the invention, such as will enable others skilled in the art to which it appertains to make and use the same.

The chief object of this invention is to provide for planting peanuts in the shell by means of a seed dropper of the type described and shown in the patents granted to Geo. R. Dykes and numbered 604,738 and 616,298.

Heretofore it has been customary to shell the peanuts before they are planted, no satisfactory means for mechanically dropping them in the shell having been devised. The preliminary operation of shelling involves a great waste of time and labor and some personal discomfort when a larger area is to be planted as is often the case with this important crop. To avoid such loss and inconvenience and expedite the work of planting applicant makes the seed cups of an oblong shape having a rim of elliptical form, each cup being suited in size and shape to conveniently dip up and carry one peanut at a time, the latter lying at length in said cup and being dropped into the seed tube as said cup reaches the proper point therefor, so that the peanuts are automatically planted singly at due intervals. These cups are made detachable from the rods carrying them in order that the small cups heretofore chiefly used in these machines, or cups of any other known and convenient form may be substituted for them as needed, thus fitting the machine for dropping any other kind of seed, beside its main use and purpose above described.

Another improvement included in this invention is a removable slide having an opening of less size than that permanently made in the wall of the spout and working over the same in order that the cups may have a larger or smaller opening to pass through according to the size of the cup which is chosen and general convenience.

In the accompanying drawings Figure 1 represents a side elevation of a seed dropper embodying my invention partly broken away; Fig. 2, an enlarged detail section on line 2—2 of Fig. 1 of a portion of the seed spout, showing one of the oblong peanut-holding seed-cups passing through the opening in said spout, the slide being shown as drawn out of the way. Fig. 3, a similar view with the slide in place and cups for other seed passing through the opening in said plate; Fig. 4, a detail plan view of one of the oblong cups employed for holding a single peanut; Fig. 5, a central section of the same; and Fig. 6, a detail perspective view of one of the small cups adapted to be substituted for said oblong cups as above explained.

A designates the frame of the seed dropper mounted on wheel *a* and provided with a plow point *b* for covering the seed. B designates the seed box mounted on said frame and having at its forward end a seed spout C extending down below it. Said spout has also an inner wall C′ extending up within the seed box and constituting a partition between the said spout and the interior of the body of the seed box. This inner wall or partition has a vertical slot D formed in it for the passage of the seed cup arms hereinafter described. The upper part of said wall is also covered over inwardly at D′ to a point above the seed cup shaft and the slot D is extended through said curved part to its upper or inner edge. The lower end of said slot connects with an opening E for the passage of the seed cups successively out of the spout C. This opening should fit the cups pretty closely to prevent seed escaping through the same at the side of the cup. I therefore provide a removable slide F covering said opening and provided with a smaller opening G for use with smaller cups.

The main purpose of my invention is to plant peanuts in the shell one at a time and I use for that purpose cups H of oblong form having an elliptical rim, each cup being adapted to hold a single peanut lying at length therein. But for planting some other seeds a smaller and deeper cup I of circular rim is preferable and these latter cups will pass through a smaller opening such as G, the wall of which will prevent the leakage of seed and the passage of foreign matter by reason of its contiguity to the side of the cup. These cups H and I are interchangeable being preferably screw-tapped at *h* and *i* to turn on the screw-threaded ends *j* of the seed cup arms or rods J mounted like wheel spokes on hub K of seed cup shaft L, said shaft being journaled in the walls of said seed box and driven by an endless chain O connecting sprocket wheels M and N, the former wheel being carried by the shaft of transportation wheel a and the wheel N turning with shaft L.

When the small cups I are used the machine will answer all the purposes of the machines described in the patents before mentioned, but the addition of the oblong cups H and the facility of substituting them for said small cups, adapt it to be used for planting peanuts in the shell one at a time, thus obviating the trouble and expense of shelling the peanuts. In view of the importance which this crop has now attained, the great area thus planted and the quantities of peanuts used for seed, it will be seen that this improvement is of great practical value.

The seed box is provided with a bottom gate P for convenience of emptying and cleaning.

A' designates the furrower which may be of any shape to fulfil its duty of making a furrow into which the seed may be dropped. This furrower should be adjustable and is so shown in the drawings. The adjustability is required in order that different kinds of seed may be used for it is well known that some kinds of seed require to be planted at one depth and some at another depth.

Having thus described my invention what I claim as new and desire to secure by Letters Patent is:

1. In a seed dropper for planting peanuts, the combination of a seed box, hub and seed-spout with a revolving series of cups arranged to dip successively into the said box and discharge through the said spout, each cup being oblong in form and adapted to pick up and hold a single peanut in the shell, said seed cups being so arranged that when one is in its highest position its center will be vertically above the center of the hub upon which it is mounted as shown.

2. In a seed dropper, the combination of a seed box having an opening for the passage of seed cups, with a seed spout, a revolving series of removable and interchangeable cups arranged to dip successively into said box and discharge through the said spout and a removable slide adapted to be moved into position over said opening and out of such position the said slide being provided with a smaller opening in order that the machine may be adapted to use with larger or smaller cups at will substantially as set forth.

3. In a seed dropper, a seed box, a hub rotating therein, a series of detachable seed cups, arms carried by said hub, interchangeable cups of different forms and sizes adapted to be put on and carried by said arms, a seed spout having a slotted slide for the passage of said arms and also an opening for the passage of the cups successively out of the spout after discharging the seed and a slide adapted to be moved into or out of position over said opening and provided with a smaller opening for use with smaller cups substantially as set forth.

In testimony whereof, I have signed my name to this specification in the presence of two subscribing witnesses.

SARAH FRANCES DYKES.

Witnesses:
 JNO. H. CALDWELL,
 L. C. RAGAN.